US007929860B2

(12) United States Patent
Miller et al.

(10) Patent No.: US 7,929,860 B2
(45) Date of Patent: Apr. 19, 2011

(54) SYSTEM AND METHOD FOR SONET EQUIPMENT FAULT MANAGEMENT

(75) Inventors: Karl E. Miller, Chandler, AZ (US); Gregory C. Ladden, Vernon Hills, IL (US); Takahito Yoshizawa, Boom (BE)

(73) Assignee: Motorola Mobility, Inc., Libertyville, IL (US)

( * ) Notice: Subject to any disclaimer, the term of this patent is extended or adjusted under 35 U.S.C. 154(b) by 787 days.

(21) Appl. No.: 11/872,233

(22) Filed: Oct. 15, 2007

(65) Prior Publication Data
US 2009/0097842 A1 Apr. 16, 2009

(51) Int. Cl.
H04B 10/08 (2006.01)

(52) U.S. Cl. ........ 398/24; 398/10; 398/17; 398/22; 398/23; 370/219; 370/220

(58) Field of Classification Search ...... 398/5; 370/219, 370/220
See application file for complete search history.

(56) References Cited

U.S. PATENT DOCUMENTS

| | | | | |
|---|---|---|---|---|
| 4,783,137 A * | 11/1988 | Kosman et al. | ........ | 385/53 |
| 5,315,424 A | 5/1994 | Boden et al. | | |
| 5,524,153 A * | 6/1996 | Laor | ........ | 385/16 |
| 5,524,218 A | 6/1996 | Byers et al. | | |
| 6,005,702 A * | 12/1999 | Suzuki et al. | ........ | 398/185 |
| 6,111,852 A * | 8/2000 | Leung et al. | ........ | 370/217 |
| 6,252,846 B1 * | 6/2001 | Fujita | ........ | 370/220 |
| 6,278,689 B1 * | 8/2001 | Afferton et al. | ........ | 370/223 |
| 6,323,950 B1 * | 11/2001 | Kim et al. | ........ | 356/477 |
| 6,590,864 B1 * | 7/2003 | Suzuki | ........ | 370/225 |
| 6,608,812 B1 * | 8/2003 | Wils et al. | ........ | 370/217 |
| 6,625,753 B1 * | 9/2003 | Skogman et al. | ........ | 714/13 |
| 6,975,586 B1 * | 12/2005 | Yoshimura | ........ | 370/217 |
| 6,999,411 B1 * | 2/2006 | Brewer et al. | ........ | 370/220 |
| 7,027,390 B2 * | 4/2006 | Wakai et al. | ........ | 370/218 |
| 7,099,578 B1 * | 8/2006 | Gerstel | ........ | 398/5 |
| 7,130,275 B2 * | 10/2006 | Gross et al. | ........ | 370/242 |
| 7,257,746 B2 * | 8/2007 | Schirdewahn | ........ | 714/712 |
| 7,349,962 B2 * | 3/2008 | Miller et al. | ........ | 709/224 |
| 7,394,776 B2 * | 7/2008 | Lee et al. | ........ | 370/310 |
| 7,398,018 B2 * | 7/2008 | Ohara | ........ | 398/5 |
| 7,568,125 B2 * | 7/2009 | Kurapati et al. | ........ | 714/7 |
| 7,570,583 B2 * | 8/2009 | Broberg et al. | ........ | 370/219 |
| 7,613,108 B2 * | 11/2009 | Takehara et al. | ........ | 370/222 |
| 7,660,236 B2 * | 2/2010 | Saha et al. | ........ | 370/219 |
| 7,865,077 B2 * | 1/2011 | Mukojima | ........ | 398/1 |
| 2002/0097743 A1 * | 7/2002 | Baydar et al. | ........ | 370/463 |
| 2002/0176355 A1 * | 11/2002 | Mimms et al. | ........ | 370/216 |
| 2003/0076557 A1 * | 4/2003 | Stevens | ........ | 359/110 |
| 2003/0076846 A1 * | 4/2003 | Heinz et al. | ........ | 370/404 |
| 2003/0105799 A1 * | 6/2003 | Khan et al. | ........ | 709/201 |
| 2003/0185563 A1 * | 10/2003 | Stephens et al. | ........ | 398/33 |

(Continued)

Primary Examiner — Ken N Vanderpuye
Assistant Examiner — Tanya Ngo

(57) ABSTRACT

A fiber-optic communications interface (110) and method of operation that operates with a paired fiber-optic communications interface (112) in a redundant communications termination point (101). The fiber-optic communications interface (110) has a paired card interface (122) that exchanges at least a first subset of status data between a local bearer processor (124) and a paired bearer processor (144) located within a different card cage (112). The local bearer processor (124) processes bearer data channels communicating with a remote site (102) through a remote site fiber-optic line (106). A local data interface (128) exchanges data contained in the bearer data channels between the local bearer processor (124) and a local user data network (114). The local data interface (128) also exchanges at least a second subset of the status data with the paired bearer processor (144) through the local user data network (114).

16 Claims, 5 Drawing Sheets

U.S. PATENT DOCUMENTS

| | | |
|---|---|---|
| 2004/0022545 A1* | 2/2004 | Chiu .............................. 398/141 |
| 2004/0085895 A1* | 5/2004 | Zettinger et al. ............. 370/220 |
| 2004/0208506 A1* | 10/2004 | Kinoshita et al. ............... 398/19 |
| 2004/0208510 A1* | 10/2004 | Ohara ............................. 398/19 |
| 2004/0252645 A1* | 12/2004 | Gross et al. .................. 370/242 |
| 2005/0027856 A1* | 2/2005 | Miller et al. .................. 709/224 |
| 2005/0085227 A1* | 4/2005 | Nishimura et al. ........... 455/428 |
| 2005/0147409 A1* | 7/2005 | Colven et al. ..................... 398/5 |
| 2005/0152269 A1* | 7/2005 | Liu ............................... 370/225 |
| 2006/0171717 A1* | 8/2006 | Kikuchi ........................... 398/83 |
| 2006/0287742 A1* | 12/2006 | Khan et al. ...................... 700/90 |
| 2007/0058973 A1* | 3/2007 | Tanaka ............................. 398/1 |
| 2007/0081482 A1* | 4/2007 | Roh et al. ...................... 370/312 |
| 2007/0217788 A1* | 9/2007 | Gao et al. ......................... 398/5 |
| 2007/0230953 A1* | 10/2007 | Nagaki et al. ..................... 398/5 |
| 2008/0126812 A1* | 5/2008 | Ahmed et al. ................. 713/189 |
| 2008/0232819 A1* | 9/2008 | Mukai ........................... 398/168 |
| 2008/0285437 A1* | 11/2008 | Polland ......................... 370/219 |
| 2009/0060504 A1* | 3/2009 | Chang et al. .................... 398/48 |
| 2009/0232492 A1* | 9/2009 | Blair et al. ........................ 398/5 |
| 2009/0239575 A1* | 9/2009 | Fu ............................... 455/552.1 |
| 2009/0239576 A1* | 9/2009 | Liao et al. ................... 455/552.1 |
| 2009/0270130 A1* | 10/2009 | Lee et al. ...................... 455/558 |

* cited by examiner

| STATUS HEARTBEAT FROM LOCAL BEARER PROCESSOR RECEIVED BY LOCAL CONTROLLER (502) | RESULTING ACTION (504) |
|---|---|
| HEARTBEAT PRESENT (512) | NO ACTION |
| LOSS OF HEARTBEAT (514) | CONTROLLER COMMANDS RESET OF LOCAL BEARER PROCESSOR |

| LOCAL RESOURCE STATUS AS DETERMINED BY LOCAL BEARER PROCESSOR (602) | BEARER PROCESSOR'S REPORTED STATUS TO PAIRED BEARER PROCESSOR (604) | BEARER PROCESSOR'S NOTIFICATION TO SHELF LEVEL CONTROLLER (606) |
|---|---|---|
| ALL LOCAL RESOURCES HEALTHY (612) | "CAPABLE" | NONE |
| LOSS OF ANY SINGLE RESOURCE CAPABILITY (614) | "NOT CAPABLE" | INDICATION OF WHICH RESOURCES ARE NOT HEALTHY |

| STATUS REPORTS FROM PAIRED BEARER PROCESSOR | RESULTING STATUS OF LOCAL BEARER PROCESSOR REPORTED OVER LINKS AFTER FAULT MANAGEMENT DECISION IS MADE | RESULTING ACTION BY LOCAL BEARER PROCESSOR |
|---|---|---|
| BOTH LINKS REPORT STATUS FROM PARIED PROCESSOR AS ACTIVE | STANDBY | GOES STANDBY |
| ONLY ONE STATUS LINK FROM PAIRED BEARER PROCESSOR IS LOST | STANDBY | GOES STANDBY |
| ALL OTHER CASES | STANDBY | GOES ACTIVE |

FIG. 7

SYSTEM AND METHOD FOR SONET EQUIPMENT FAULT MANAGEMENT

CROSS-REFERENCE TO RELATED APPLICATION

Not Applicable

FIELD OF THE INVENTION

The present invention generally relates to the field of enhancing electronic system reliability, and more particularly relates to circuits and processing to manage faults in redundant systems.

BACKGROUND OF THE INVENTION

High capacity fiber-optic communications systems are often used to provide highly reliable data communications between two points. Some fiber-optic communications systems are based on the SONET (Synchronous Optical NETwork) standard. The SONET standard includes a number of Optical Carrier (OC) specifications that define the data rate carried by a fiber-optic line. One example of data transmission levels of SONET systems is SONET OC-3, which defines specific data rate and multiplexing schemes for signals carried across the fiber-optic line. Some SONET systems communicate data by using a redundant pair of fiber-optic lines to connect two endpoints such that a fault or failure on one of the fiber-optic lines or its endpoint equipment is accommodated by use of the other redundant fiber-optic line. SONET systems generally carry multiplexed data that are organized as bearer channels. Examples of bearer channels include digitized voice channels used to carry telephone conversations. The multiplexed data carried over a SONET fiber-optic line are generally generated for transmission and processed upon reception by a bearer processor. The bearer processor accepts multiple streams of user data and generates the OC-3 data stream for transmission. The bearer processor also accepts a received OC-3 data stream, extracts the user data and delivers it to external interfaces for delivery to other user equipment.

The processing equipment located at each end of each single fiber-optic communications line within a redundant fiber-optic pair is generally located in one card cage. The fiber-optic lines generally terminate at a SONET line card that extracts a raw OC-3 data stream to be provided to a bearer processor within the same card cage. The SONET standard has been augmented by an Automatic Protection Switching (APS) mechanism to standardize processing to detect faults or failures and switch between fiber-optic lines of the redundant fiber-optic pairs. The SONET APS, however, does not support component fault management or failure protection processing across cages or for the bearer path beyond the SONET line card. Although the SONET APS provides availability enhancement by effectively using redundant fiber-optic lines to recover from some faults or failures, the availability of the overall communications system is still limited by the effective signal path being forced back to a bearer data path that is susceptible to a single point of failure inside the bearer processing equipment within each card cage.

Data communications transport components usually require availability on the order of six nines (i.e., an availability of 0.999999) rather than the five nines, (i.e., 0.99999) that is normally required for bearer processing network elements. The availability of that single card cage, due to anticipated failures of components within the cage, is often the "noise floor" limiting availability of a fiber-optic data communications system beyond five nines.

Therefore, an availability improvement to failure handling in redundant fiber-optic pair SONET communications system is needed.

SUMMARY OF THE INVENTION

Briefly, in accordance with one aspect of the present invention, a fiber-optic communications interface that can operate with a paired fiber-optic communications interface to form a redundant communications termination point includes a paired card interface that is coupled to a cross-cage fiber-optic line that is communicatively coupled to a paired bearer processor located within a different card cage within a communications termination point. The paired card interface is also coupled to a local bearer processor that is adapted to process bearer data containing bearer data channels communicating with a remote site through a remote site fiber-optic line. The paired card interface adapted to exchange at least a first subset of status data between the local bearer processor and the paired bearer processor through the cross-cage fiber-optic line. The fiber-optic communications interface further includes a local data interface that is coupled to the local bearer processor and a local user data network and adapted to exchange data between the local bearer processor and the local user data network. The data having been exchanged through the bearer channels and processed by the local bearer processor. The local data interface is further adapted to exchange at least a second subset of the status data with the paired bearer processor through the local user data network.

In accordance with another aspect of the present invention, method for performing fault management on a fiber-optic communications interface that can operate with a paired fiber-optic communications interface to form a redundant communications termination point includes exchanging at least a first subset of status data between a local bearer processor and a paired bearer processor through a cross-cage fiber-optic interface. The paired bearer processor located within a different card cage within the communications termination point. The method further includes exchanging at least a second subset of the status data between the local bearer processor and the paired bearer processor through a local user data circuit that is separate from the cross-cage fiber-optic interface.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 illustrates a bearer processor local resource monitoring logic table, in accordance with one embodiment of the present invention.

FIG. 6 illustrates a monitor local resource status logic table, in accordance with one embodiment of the present invention.

FIG. 7 illustrates a remote paired bearer processor status response logic table 700, in accordance with one embodiment of the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as illustrative examples for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
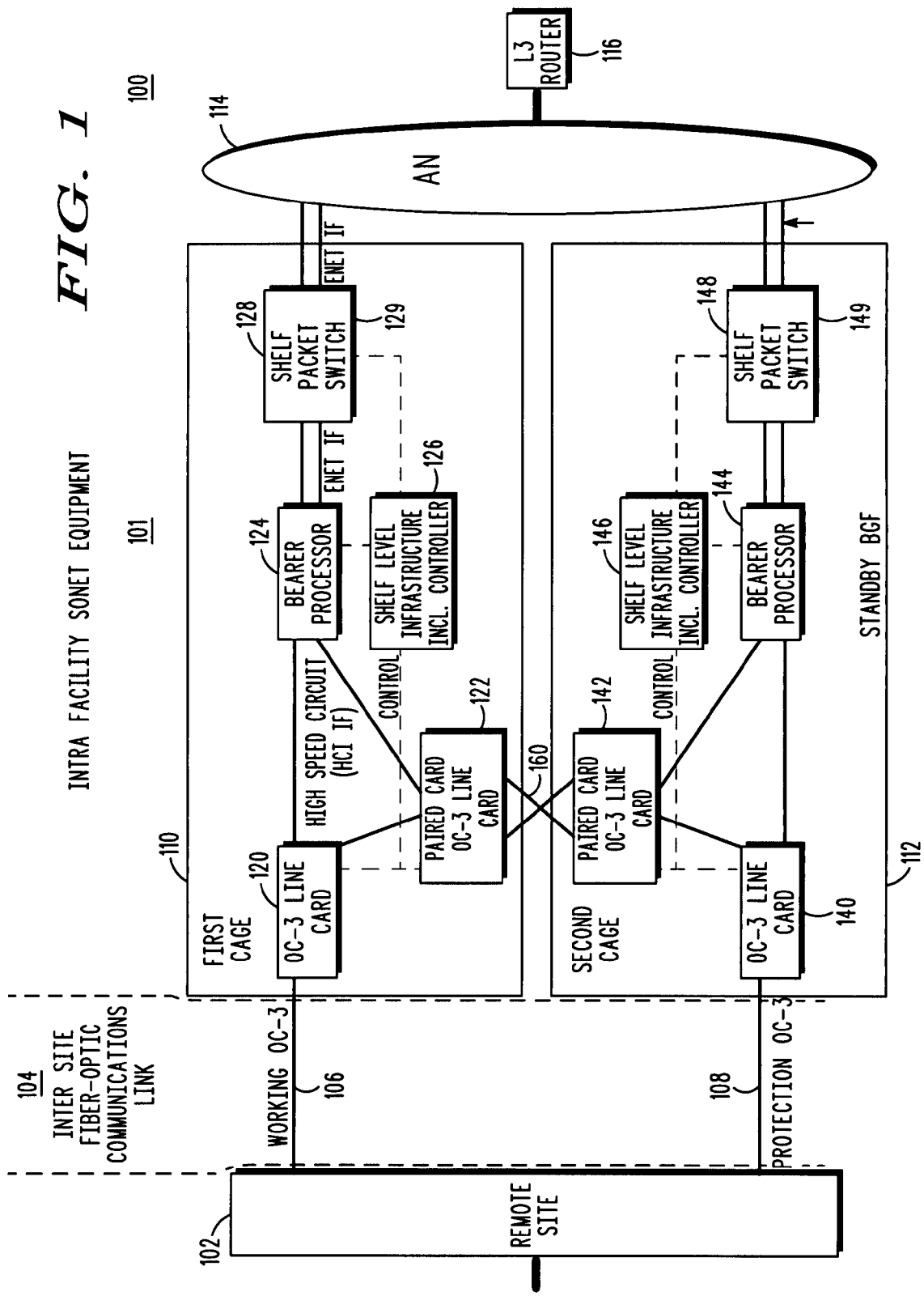
FIG. 1 illustrates two cage redundant fiber-optic line SONET fiber-optic communications system, in accordance with one embodiment of the present invention.

FIG. 1 illustrates two cage redundant fiber-optic line SONET fiber-optic communications system (hereinafter "fiber-optic communications system") 100, in accordance with one embodiment of the present invention. The fiber-optic communications system 100 includes two equipment cages, a first cage 110 and a second cage 112, that are configured to provide a redundant fiber-optic termination point for a single, but redundant, SONET bidirectional redundant fiber-optic circuit pair 104. These two equipment cages are part of an intra-facility SONET equipment installation 101, such as is found in a SONET termination facility. The two equipment cages, such as the first cage 110 and the second cage 112, can be located in a common equipment rack or can be located in separate locations within a facility. In some embodiments, the two cages can be located at greater distances from each other, as is desired for a particular installation, such as required by a facility's redundancy plan.

The two equipment cages, such as the first cage 110 and the second cage 112, connect to a remote site 102 through a redundant fiber-optic circuit pair 104. In one embodiment, the redundant fiber-optic circuit pair 104 provides an operational OC-3 fiber-optic circuit 106 and a redundant protection OC-3 fiber-optic circuit 108 for the communications of bearer data. In this context, bearer data includes not only bearer channel data but also the other data defined as part of the OC-3 protocol The operation of one embodiment of the fiber-optic communications system 100 provides fault management and failure recovery for failures of the fiber-optic circuits according to processing defined by the SONET APS.

Each fiber-optic cable of the redundant fiber-optic circuit pair 104 is connected to one OC-3 line card. The operational OC-3 fiber-optic cable 106 is connected to a first OC-3 line card 120 of the first cage 110. The protection OC-3 fiber-optic cable 108 is connected to a second OC-3 line card 140 of the second cage 112. Fault management and failure detection is performed in one embodiment of the present invention according to the processing defined by the SONET APS.

Each OC-3 line card, such as the first OC-3 line card 120 and the second OC-3 line card 140, exchange received and to be transmitted bearer data communicated through the redundant fiber-optic circuit pair 104 with a corresponding bearer processor located in the same cage. For example, the first OC-3 line card 120 exchanges data with a first bearer processor 124. The second OC-3 line card 140 similarly exchanges data with a second bearer processor 144. Each of the bearer processors in one embodiment is adapted to process bearer channels and to communicate with a remote site 102 through a remote site fiber optic line, such as the redundant fiber-optic circuit pair 104. The bearer processor of one embodiment performs bearer channel processing as required by the SONET standard used by that embodiment.

In addition to exchanging data with a corresponding bearer processor, each OC-3 line card of one embodiment is also able to exchange data with a paired cage interface that is also located in the same cage as that OC-3 line card. For example, the first OC-3 line card is configured to exchange data with a first paired cage OC-3 line card 122. The second OC-3 line card 140 exchanges data with a second paired cage OC-3 line card 142. Each of these paired cage OC-3 line cards is connected, through a fiber-optic crossover connection 160, to the paired cage OC-3 line card located in the other cage that forms a redundant pair of fiber-optic end point processors within the intra-facilities SONET equipment 101. In one embodiment, the first paired cage OC-3 line card 122 is connected through the fiber-optic cross over connection 160 to the second paired cage OC-3 line card 142.

The connection of the pair of redundant cages by the fiber-optic cross over connection 160 allows the bearer processor in either of the two cages to receive bearer data from the OC-3 line card of the other cage. For example, a failure of the second OC-3 line card 140 allows the second bearer processor 144 to communicate OC-3 bearer data through the first OC-3 line card 120 of the other cage, thereby increasing availability of the intra-facility SONET equipment installation 101. In this embodiment, the first cage 110 is a fiber-optic communications interface that is coupled to a cross-cage fiber-optic line 160 that connects to the second cage 112.

The use of the fiber-optic cross over connection 160 also provides one path for the bearer processors to exchange at least one subset of the status data that is exchanged between the two cages to support implementing additional fault management and redundant processing, as is described in detail below. In one embodiment, a first subset of status data is exchanged by using one bearer channel of the OC-3 signal that is communicated with the remote site 102. Since the operation of the first cage 110 and the second cage 112 causes the OC-3 data communicated with the remote site 102 to be received by the respective bearer processor in the first cage 110 and the second cage 112, this path is an effective communications path for exchanging status data between the two bearer processors, and therefore the two cages.

The paired cage OC-3 line card of each cage is also configured to exchange data with the bearer processor located within that cage. For example, the first bearer processor 124 located within the first cage 110 is coupled to the first paired cage OC-3 line card 122 and the second bearer processor 144 is coupled to the second paired cage OC-3 line card 142. This communications path, in combination with the fiber-optic crossover connection 160, provides an additional path in one embodiment for the two bearer processors of the redundant pair of cages to exchange data with each other, such as operational status data and other fault data.

Each bearer processor of one embodiment is connected to one or more shelf packet switches, which are an example of a local data interface. For example, the first bearer processor 124 is connected to a first shelf packet switch 128 and a second shelf packet switch 129. The second bearer processor 144 is similarly connected to a third shelf packet switch 148 and a fourth packet switch 149. Each shelf packet switch is, in turn, connected to a facility access network 114, such as an Ethernet based local communications network, to allow the exchange of data between the SONET cages and other data communications equipment.

The local data interfaces are coupled to a bearer processor located in its cage and exchange data that was communicated through the fiber-optic interface, such as the OC-3 bearer data communicated through first OC-3 line card 120, between that bearer processor and a local data network, such as the facility access network 114. One embodiment of the present invention further establishes a packet switched communications circuit between the first cage 110 and the second cage 112 to exchange, for example, status data between the two cages. The local data interface, such as the shelf packet switch 128, exchanges at least a second subset of the status data with the paired fiber-optic communications interface, such as the second cage 112, through a local user data network, such as the facility access network 114.

In one example, the first cage 110 and the second cage 112 of one embodiment establish a local data communications link with an L3 router 116 to exchange OC-3 bearer data with destinations that are intended to receive or originate the OC-3 bearer data. The L3 router 116 of one embodiment is a user data router that receives all bearer data communicated through the redundant fiber-optic circuit pair 104 and operates to properly route data between end users and the intra facility sonnet equipment 101. The first cage 110 and the second cage 112 communicate with the L3 router 116 through the facility access network 114. In one embodiment, a local data communications path between the first cage 110 and the second cage 112, which is used to exchange status data between the first cage 110 and the second cage 112, is a super set of the data communications path used to connect either of the cages to the L3 router 116. That is to say that the first cage and the second cage communicate with the L3 router over paths within the facility access network 114 that are the exact network links used to create a communications path between the two cages.

Because the local data communications path between the first cage 110 and the second cage 112 is a superset of the communications paths between each of the card cages and the L3 router 116, the inability of the two cages to communicate with each other over the facility access network 114 indicates that one of the cages is unable to communicate with the L3 router 116.

One embodiment of the present invention takes advantage of the above configuration, where local data communications path between the first cage 110 and the second cage 112 is a super set of the data communications path used to connect each of the cages to the L3 router 116, to simplify fault management processing and related inter-bearer processor coordination. Such embodiments cause the respective bearer processors in each of the two cages to become the active bearer processor when communications between the two cages is lost over the facility access network 114. In such a situation, it is possible that only one of the bearer processors will be able to communicate with the L3 router 116, but both bearer processors will not be able to communicate with the L3 router 116. Both bearer processors will not be able to communicate with the L3 router 116 when there is a fault in the communications link between the two bearer processors because the path between the two bearer processors includes the route to the L3 router 116. Any fault in the communications links between the bearer processors will preclude at least one of the bearer processors from communicating with the L3 router 116. Because one of the bearer processors is not able to communicate with the L3 router 116, only one bearer processor will assume the active bearer processor role. A fault in the cross-cage OC-3 path forces each of the bearer processors in the two cages to determine if it can be the active processor based on its own capability to access the L3 router.

Each cage of one embodiment has a controller, such as the first controller 126 of first cage 110 and the second controller 146 of second cage 112, that controls the operation of all components within its respective cage. The controller of a particular cage in one embodiment performs processing to implement fault management and failure recovery in response to detected failures of components within its cage, as is described in detail below.

In one embodiment, the processing circuits within each of first cage 110 and second cage 112 exchange status data to provide an indication of the operational status and fault conditions for the respective cages. The status data exchanged between first cage 110 and second cage 112 are exchanged in one embodiment over two paths, a data path using the fiber-optic crossover connection 160 and the facility access network 114.

For example, the first cage 110 has a first controller 126 that controls the first OC-3 line card 120, the first bearer processor 124, the first paired cage OC-3 line card 122 and the shelf packet switches of the first cage 110, such as the first shelf packet switch 128 and the second shelf packet switch 129.

Using first cage 110 as an example, one embodiment of the present invention includes a controller 126 that is coupled to the bearer processor 124 and the shelf packet switches 128, 129, which are an example of local data interfaces. The controller 126 is adapted to monitor status data communicated between itself and the local bearer processor 124.

Figure 2:
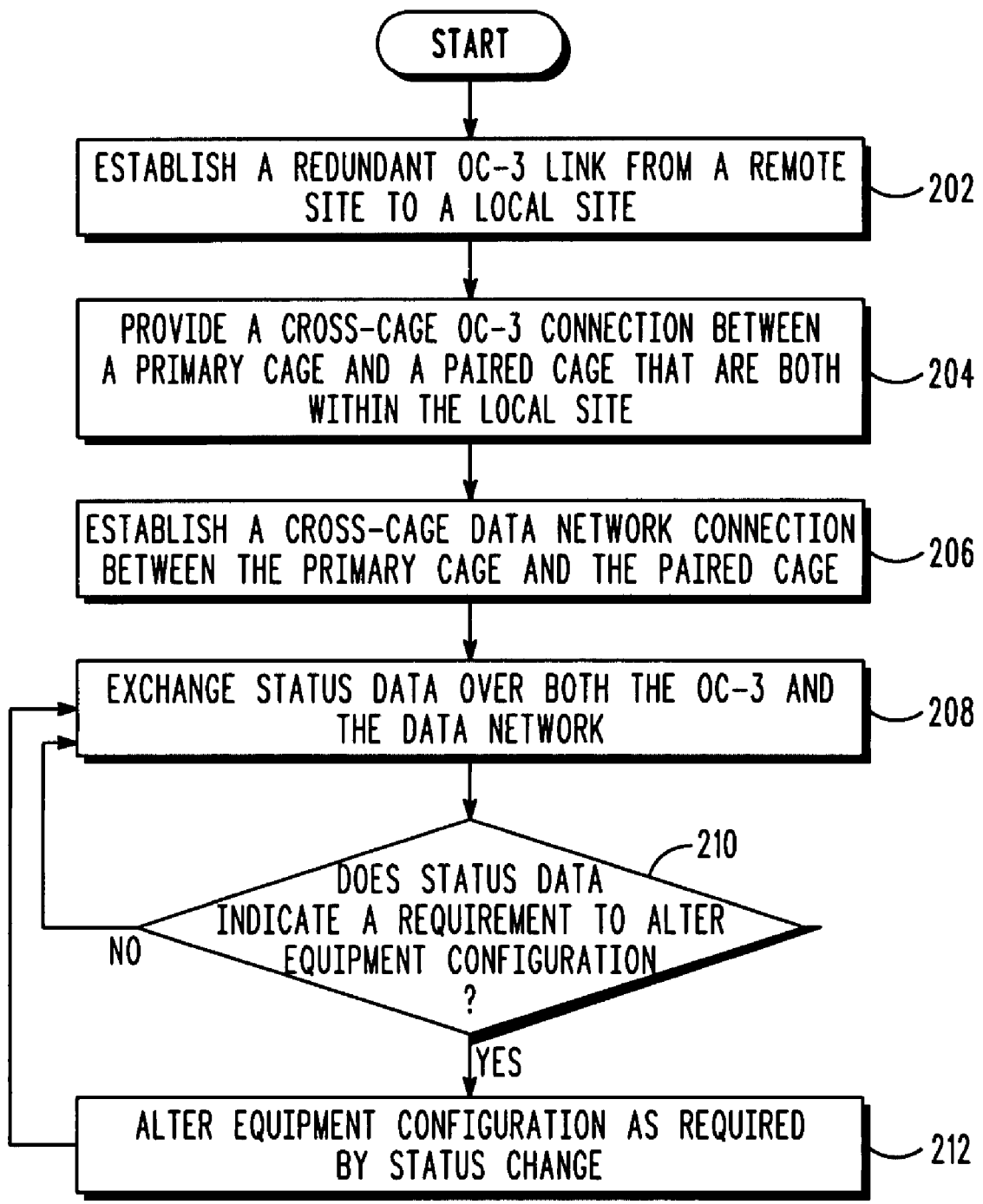
FIG. 2 illustrates a fault management processing flow, in accordance with one embodiment of the present invention.

FIG. 2 illustrates a fault management processing flow 200, in accordance with one embodiment of the present invention. The fault management processing flow 200 begins by establishing, at step 202, a protected OC-3 link between a local site and a remote site. The processing of one embodiment performs this establishment according to the procedure defined by an applicable OC-3 standard. The fault management processing flow 200 continues by providing, at step 204, a cross-cage OC-3 connection between a primary cage and a paired cage that are both within a local site. In one embodiment, this cross-cage OC-3 connection is established through the paired cage OC-3 line cards of each cage and the fiber-optic crossover connection 160. This cross-cage OC-3 connection of one embodiment is established through the bearer processors of each cage and under the control of the respective controllers that are connected to that bearer processor. In one embodiment, the cross-cage OC-3 connection is established by allocating one DS1 channel within the OC-3 link to carry status data between the bearer processors of the paired, redundant cages.

The fault management processing flow diagram 200 continues by establishing, at step 206, a cross-cage user data network connection between the primary cage and the paired cage described above. This cross-cage data network connection is a redundant data connection that carries status data similar to that carried by the cross-cage OC-3 connection described above. The cross-cage data network connection of one embodiment is established via a packet switched connection between the two bearer processors of the paired cages through a respective shelf packet switch and the facility access network 114.

Once the two above cross-cage connections, i.e., the cross-cage OC-3 connection and the cross-cage user data network connection, are established, the fault management processing flow diagram 200 exchanges, at step 208, status data over both the cross-cage OC-3 connection and the cross-cage data network connection. This status data is exchanged between the two bearer processors of each cage and is also provided to the controller of each cage. Status data that is exchanged over these two connections includes, for example, heart beat signals, indicators of a link presence and/or link quality indicators, bearer processor state, bearer processor capability, and any other data.

The fault management processing flow diagram 200 continues by determining, at step 210, if the received status data indicates a requirement to alter the equipment configuration. In one embodiment, the lack of receipt of status data over one of the cross-cage connections is used as a failure detection mechanism to trigger reconfiguration of the redundant equipment to ensure continued operation after a fault that affects the communications circuits that convey one or both of the above described cross-cage status data connections.

If the received status data does not indicate that the equipment is to be reconfigured, the processing returns to exchanging, at step 208, status data over both cross-cage connections. If the received status data does indicate that the equipment is to be reconfigured, the processing continues by altering, at step 212, the equipment configuration as required by the status change, as is described below. The processing then continues by returning to exchanging, at step 208, status data over both cross-cage connections.

Figure 3:
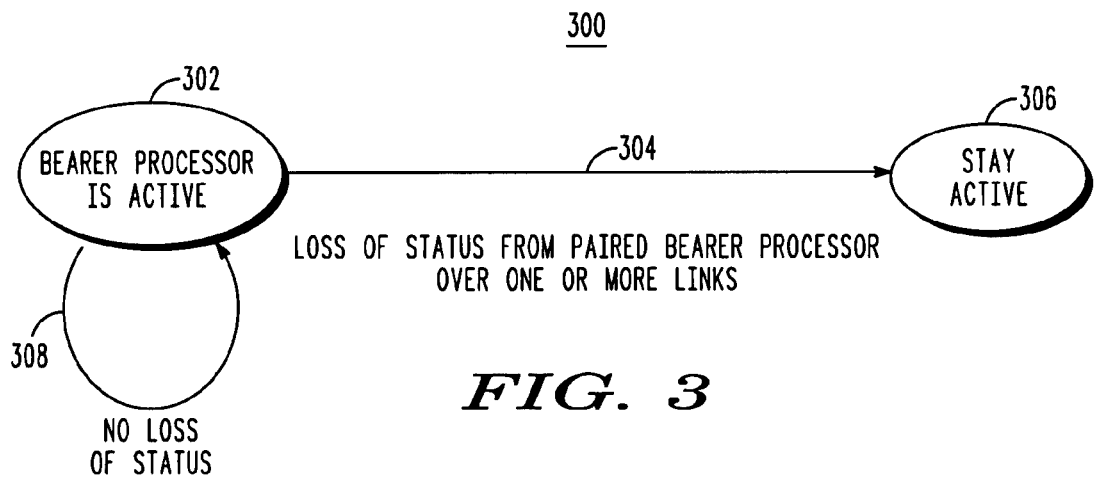
FIG. 3 illustrates an active bearer processor status receive failure response 300, in accordance with one embodiment of the present invention.

FIG. 3 illustrates an active bearer processor status receive failure response 300, in accordance with one embodiment of the present invention. The active bearer processor status receive failure response 300 begins with the bearer processor which is in active state 302. In the normal case, there is no loss of status data reception from the paired bearer processor and the "no loss of status" loopback transition 308 causes the bearer processor to remain in the active state. Upon an occurrence of a loss of status reception from a paired bearer processor over one or more connections (event 304) the bearer processor transitions to a stay active state 306, wherein the bearer processor retains its status as the active bearer processor. The loss of status reception over one or more connections (event 304) may be triggered by, for example, a loss of status data reception over one or both of the above described cross-cage OC-3 connection or the cross-cage user data network connection. In one embodiment, the controller is adapted to configure the bearer processor to continue to operate as the active bearer processor in response to the bearer processor being configured to operate as the active bearer processor and to failing to receive at least one of the first subset of status data and the second subset of status data.

Figure 4:
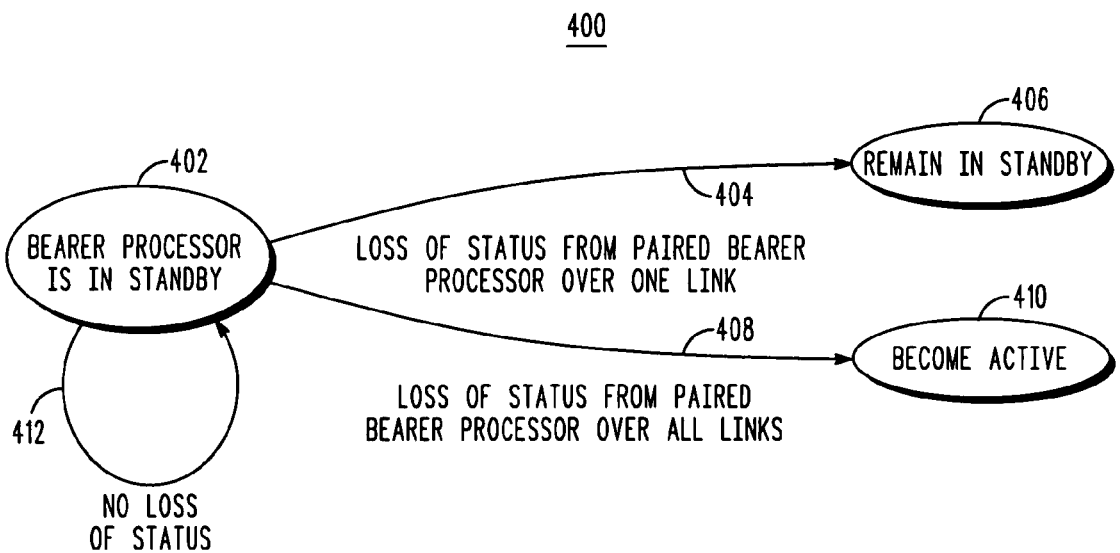
FIG. 4 illustrates a standby bearer processor status receive failure response 400, in accordance with one embodiment of the present invention.

FIG. 4 illustrates a standby bearer processor status receive failure response 400, in accordance with one embodiment of the present invention. The standby bearer processor status receive failure response 400 begins with the bearer processor in standby state 402. In the normal case, there is no loss of status data reception from the paired bearer processor and the "no loss of status" loopback transition 412 causes the bearer processor to remain in the standby state. Upon an occurrence of a loss of status reception from a paired bearer processor over only one connection (event 404) the bearer processor transitions to a remain in standby state 406, wherein the bearer processor retains its status as the standby bearer processor of the redundant pair. The loss of status reception over only one connection (event 404) may be triggered by, for example, a loss of status data reception over only one but not both of the above described cross-cage OC-3 connection or the cross-cage data network connection.

Upon an occurrence of a loss of status reception from a paired bearer processor over all connections event 408, which is triggered, for example, by a loss of status data reception over both of the above described cross-cage OC-3 connection or the cross-cage data network connection, the bearer processor transitions to a become active state 410, wherein the bearer processor becomes the active bearer processor of the redundant pair. As described above, the local data communications path between the first cage 110 and the second cage 112 is a super set of the data communications path used to connect each of the cages to the L3 router 116. Any fault in the communications links between the bearer processors will preclude at least one of the bearer processors from also communicating with the L3 router 116. Since one of the bearer processors is not able to communicate with the L3 router 116, only one bearer processor will assume the active bearer processor role since only one of the bearer processors will communicate beater data with the L3 router.

FIG. 5 illustrates a bearer processor local resource monitoring logic table (hereinafter "monitoring logic table") 500, in accordance with one embodiment of the present invention. The monitoring logic table 500 of one embodiment depicts the processing of a local controller, such as is contained in the shelf level infrastructure 126, to monitor the reported status of a local bearer processor and the resulting action based upon that reported status. In one embodiment, the local controller receives a heartbeat message from the local bearer processor. In one embodiment, the two Shelf Level Controllers, one in each cage of the first cage 110 and the second cage 112, monitor their respective Bearer Processors via a Fault Management Heartbeat-like mechanism. If either of the shelf level controllers notices a loss in the heartbeat mechanism from its associated bearer processor, the local controller issues a RESET of that bearer processor. When the bearer processor completes its reset processing, it will use state information available about its paired bearer processor that has been received over the cross-cage fault monitoring links to determine the state into which it should sequence The availability of the heartbeat signal at the local controller is shown in a first column 502 of the monitoring logic table 500 and the resulting action taken by the local controller is illustrated in a second column 504 of the monitoring logic table 500. A condition indicating that the local controller is receiving a heartbeat signal from the local bearer processor is shown in a heartbeat present row 512. When the heartbeat signal is present at the local controller, the controller takes no action. The processing associated with a loss of heartbeat signal from the local bearer processor at the local controller is shown in the loss of heartbeat row 514. In the event of a loss of heartbeat from the local bearer processor, the local controller commands a reset of the local bearer processor in an attempt to correct the error that resulted in the loss of the heartbeat signal from the local bearer processor.

FIG. 6 illustrates a monitor local resource status logic table (hereinafter "status logic table") 600, in accordance with one embodiment of the present invention. The status logic table 600 illustrates the logic implemented by a local bearer processor in monitoring the status of its local resources. Each bearer processor monitors its local resources to determine the functional availability of those resources. For example, a first bearer processor 124 will monitor the status of the shelf packet switch 128, the OC3 Line Card 120, 122 to which that bearer processor is connected, an upstream L3 Router, and the like. A loss of a heartbeat signal or ping response from any of these local resources indicates that the bearer processor is no longer capable of fulfilling the role of an active bearer processor of the multiple cage configuration and notifies its paired bearer processor of this capability loss.

In the following example, a bearer processor reports its status as either "capable" or "not capable" to its paired bearer processor. In this context, "Capable" means that the reporting Bearer Processor has determined that it is "capable" of performing the active bearer processor role. A Status of "not capable" means that the reporting bearer processor has determined that it is "not capable" of performing the active bearer processor role. Either bearer processor of the multiple cage configuration that receives a "not capable" indication from its paired bearer processor will assume the role of active bearer processor.

The status logic table 600 indicates in a status column 602 the monitored resource status as determined by a bearer processor. A status column 604 identifies the status reported by the bearer processor to its paired bearer processor in another cage. A bearer processor to controller notification column 606 indicates notifications reported by the bearer processor to its local controller, such as a controller contained in the shelf level infrastructure 126.

An all local resources healthy row 612 illustrates the status reported by the bearer processor in response to determining that the local resources are all healthy. As indicated in the all local resources healthy row 612, the bearer processor reports its status to its paired bearer processor as "capable," which indicates that the bearer processor can perform the role of an active bearer processor. The bearer processor also does not notify the shelf level controller of any problems.

A loss of any single resource row 614 illustrates the status reported by the bearer processor in response to determining that one or more of any local resource's capability has been lost. As indicated in the loss of any single resource row 614, the bearer processor reports its status to its paired bearer processor as "not capable," which indicates that the bearer processor is not able to perform the role of an active bearer processor. The bearer processor also notifies the shelf level controller with an indication of which resources are not healthy.

In one embodiment, the first subset of status data and the second subset of status data both comprise a heartbeat signal from the paired fiber-optic communications interface. The controller is also adapted to restart the bearer processor in response to failing to receive the heartbeat signal from the paired fiber-optic communications interface over at least one of the paired card interface and the local data interface.

In one embodiment, a bearer processor transmits a local bearer processor status data to the paired bearer processor and determines a respective status of each local resource supporting the local bearer processor in the different card cage. Each of the respective status can be one of healthy and unavailable. The local bearer processor status data is based upon the respective status of each local resource. The local bearer processor status data indicates, in response to all of the respective status of each local resource being healthy, that the local bearer processor is capable of operating in an active bearer processor state, and indicates, in response to one or more of the respective status of each local resource being unavailable, that the local bearer processor is not capable of operating in an active bearer processor state.

FIG. 7 illustrates a local bearer processor status response logic table (hereinafter "response logic table") 700, in accordance with one embodiment of the present invention. The response logic table 700 includes a paired bearer processor status link situation column 702 that indicates the situation of status reports that are received by a local bearer processor from a paired bearer processor. The response logic table 700 also includes a resulting status of bearer processor column 704 that indicates the resulting status of the local paired bearer processor after a fault management decision is made based upon the received status of the paired bearer processor. The reported status of the paired bearer processor is indicated in the paired bearer processor status link situation column 702. The resulting status of the local bearer processor that is listed in the resulting status of paired bearer processor column 704 is reported over the one or more available status communications links to the remote bearer processor. The remote paired bearer processor status response logic table 700 further includes a resulting action column 706 that indicates the action taken by the local bearer processor in response to the corresponding paired bearer processor status link situation and the reported status of the paired bearer processor shown in the resulting status of paired bearer processor column 704.

As described above, the local bearer processor and the paired bearer processor exchange status data, where the paired bearer processor is located in a different card cage within a communications termination point. The local bearer processor and the paired bearer processor exchange at least a first subset of status data through a paired card interface 122 that is connected to a cross-cage fiber-optic line 160. The local bearer processor and the remote bearer processor also exchange at least a second subset of the status data through a local user data network 114.

A both links report status from paired processor as active row 712 indicates that when both links report status from paired processor as active, the local bearer processor will go into the standby state. In one embodiment, the local bearer processor configures itself to operate in the standby state in response to receiving both of the first subset of status data received from the different card cage through the paired card interface and the second subset of status data received from the different card cage through the local data interface, and in response to the first subset of status data and the second subset of status data both indicating that the paired bearer processor is operating in the active bearer processor state.

An only one status link from the paired processor is lost row 714 indicates that when only one status link from the paired processor is lost, the local bearer processor will go into the standby state. In one embodiment, the local bearer processor is adapted to configure itself to operate in the standby state in response to losing reception of only one of the first subset of status data received from the different card cage through the paired card interface and the second subset of status data received from the different card cage through the local data interface.

An all other cases row 716 indicates that in all other cases, besides the above, the local bearer processor will go into the active state. In one embodiment, the local bearer processor is adapted to configure itself to operate in the active state when: 1) it fails to receive both the first subset of status data received from the different card cage through the paired card interface and the second subset of status data received from the different card cage through the local data interface; 2) when the first subset of status data and the second subset of status data both indicate that the paired bearer processor is operating in the active bearer processor state; and 3) it fails to loose reception of only one of the first subset of status data received from the different card cage through the paired card interface and the second subset of status data received from the different card cage through the local data interface.

As described above, the local data communications path between the first cage 110 and the second cage 112 is a super set of the data communications path used to connect each of the cages to the L3 router 116. Any fault in the communications links between the bearer processors will preclude at least one of the bearer processors from also communicating with the L3 router 116. Since one of the bearer processors is not able to communicate with the L3 router 116, only one bearer processor will assume the active bearer processor role since only one of the bearer processors will communicate beater data with the L3 router.

The present invention may be embedded in a computer program product, which comprises all the features enabling the implementation of the methods described herein, and which—when loaded in a computer system—can carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least one computer readable medium that allows the computer to read data, instructions, messages or message packets, and other computer readable information. The computer readable medium may include non-volatile memory, such as ROM, Flash memory, Disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Reference throughout the specification to "one embodiment" means that a particular feature, structure, or characteristic described in connection with the embodiment is included in at least one embodiment of the present invention. Thus, the appearances of the phrases "in one embodiment" in various places throughout the specification are not necessarily all referring to the same embodiment. Furthermore, the particular features, structures, or characteristics may be combined in any suitable manner in one or more embodiments. Moreover these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A fiber-optic communications interface that is able to operate with a paired fiber-optic communications interface to form a redundant communications termination point, the fiber-optic communications interface comprising:
    a paired card interface,
        coupled to a cross-cage fiber-optic line that is communicatively coupled to a paired bearer processor located within a different card cage within a communications termination point, and
        coupled to a local bearer processor that is adapted to process bearer data comprising bearer data channels communicating with a remote site through a remote site fiber-optic line,
    the paired card interface adapted to exchange at least a first subset of status data between the local bearer processor and the paired bearer processor through the cross-cage fiber-optic line; and a local data interface,
    coupled to the local bearer processor and a local user data network,
    adapted to exchange data between the local bearer processor and the local user data network, the data having been exchanged through the bearer channels and processed by the local bearer processor, and
    the local data interface further adapted to exchange at least a second subset of the status data with the paired bearer processor through the local user data network.

2. The fiber-optic communications interface of claim 1, further comprising a fiber-optic line interface that couples the local bearer processor with the remote site fiber-optic line to support communicating the bearer data with the remote site according to the OC-3 protocol, wherein the paired card interface further communicates the bearer data with the different card cage, and wherein the first subset of status data is exchanged through at least one bearer channel of the bearer data being communicated through the paired card interface.

3. The fiber-optic communications interface of claim 1, wherein the local bearer processor is adapted to configure itself, based upon contents of the status data, to operate as one of an active bearer processor state and a standby bearer processor state within the redundant communications termination point.

4. The fiber-optic communications interface of claim 3, wherein the local bearer processor is adapted to, in response to the local bearer processor receiving both of the first subset of status data received from the different card cage through the paired card interface and the second subset of status data received from the different card cage through the local data interface, and in response to the first subset of status data and the second subset of status data both indicating that the paired bearer processor is operating in the active bearer processor state, configure itself to operate in the standby bearer processor state.

5. The fiber-optic communications interface of claim 3, wherein the local bearer processor is adapted to, in response to losing reception of only one of the first subset of status data received from the different card cage through the paired card interface and the second subset of status data received from the different card cage through the local data interface, configure itself to operate in the standby bearer processor state.

6. The fiber-optic communications interface of claim 3, wherein the local bearer processor is adapted to configure itself to operate in the active bearer processor state in response to the local bearer processor
    failing to receive both of the first subset of status data received from the different card cage through the paired card interface and the second subset of status data received from the different card cage through the local data interface, wherein the first subset of status data and the second subset of status data both indicate that the paired bearer processor is operating in the active bearer processor state; and failing to loose reception of only one of the first subset of status data received from the different card cage through the paired card interface and the second subset of status data received from the different card cage through the local data interface.

7. The fiber optic communications interface of claim 6, wherein the local data interface is configured to:

exchange the data having been exchanged through the bearer channels with an user data router within the local user data network, the local data interface connecting to the user data router through a first data path; and exchange the at least the second subset of status data through a second data path within the local user data network, the second data path consisting of the first data path and a third data path connecting the paired data processor to the user data router.

8. The fiber-optic communications interface of claim 1, wherein the local bearer processor:

transmits a local bearer processor status data to the paired bearer processor; and determines a respective status of each local resource supporting the local bearer processor in the different card cage, wherein each of the respective status is able to be one of healthy and unavailable, and wherein the local bearer processor status data is based upon the respective status of each local resource.

9. The fiber-optic communications interface of claim 8, wherein:

the local bearer processor status data indicates, in response to all of the respective status of each local resource being healthy, that the local bearer processor is capable of operating in an active bearer processor state, and the local bearer processor status data indicates, in response to one or more of the respective status of each local resource being unavailable, that the local bearer processor is not capable of operating in an active bearer processor state.

10. A method for performing fault management on a fiber-optic communications interface that is able to operate with a paired fiber-optic communications interface to form a redundant communications termination point, the method comprising:

exchanging at least a first subset of status data between a local bearer processor and a paired bearer processor through a cross-cage fiber-optic interface, the paired bearer processor located within a different card cage within the communications termination point;

exchanging at least a second subset of the status data between the local bearer processor and the paired bearer processor through a local user data circuit that is separate from the cross-cage fiber-optic interface; and in response to receiving both of the first subset of status data received from the different card cage and the second subset of status data received from the different card cage, and in response to the first subset of status data and the second subset of status data both indicating that the paired bearer processor is operating in an active bearer processor state, configuring the local bearer processor to operate in a standby bearer processor state.

11. The method of claim 10, further comprising:

coupling the bearer processor through a remote site fiber-optic line to support communicating bearer data with the remote site according to the OC-3 protocol; and communicating the bearer data through the paired fiber-optic communications interface, wherein the first subset of status data is exchanged through at least one bearer channel of the bearer data being communicated with the remote site.

12. The method of claim 10, further comprising configuring, in response to losing reception of only one of the first subset of status data received from the different card cage and the second subset of status data received from the different card cage, the local bearer processor to operate in a standby bearer processor state.

13. The method of claim 10, further comprising configuring the local bearer processor to operate in an active bearer processor state in response to the local bearer processor failing to receive both of the first subset of status data received from the different card cage and the second subset of status data received from the different card cage, wherein the first subset of status data and the second subset of status data both indicate that the paired bearer processor is operating in the active bearer processor state, and failing to loose reception of only one of the first subset of status data received from the different card cage and the second subset of status data received from the different card cage.

14. The method of claim 10, further comprising:

transmitting a local bearer processor status data to the paired bearer processor; and determining a respective status of each local resource supporting the local bearer processor in the different card cage, wherein each of the respective status is able to be one of healthy and unavailable, and wherein the local bearer processor status data is based upon the respective status of each local resource.

15. The method of claim 14, wherein the local bearer processor status data indicates, in response to all of the respective status of each local resource being healthy, that the local bearer processor is capable of operating in an active bearer processor state, and the local bearer processor status data indicates, in response to one or more of the respective status of each local resource being unavailable, that the local bearer processor is not capable of operating in an active bearer processor state.

16. A fiber-optic communications interface that is able to operate with a paired fiber-optic communications interface to form a redundant communications termination point for an OC-3 fiber-optic communications circuit, the fiber-optic communications interface comprising:

a fiber-optic line interface that couples a local bearer processor with a remote site fiber-optic line to support communicating bearer data with the remote site according to the OC-3 protocol;

a paired card interface, coupled to a cross-cage fiber-optic line that connects to a paired bearer processor located within a different card cage within a communications termination point, and coupled to the local bearer processor, the local bearer processing being adapted to process bearer data comprising bearer channels communicating with a remote site through the remote site fiber-optic line, the paired card interface adapted to exchange at least a first subset of status data between the local bearer processor and the paired bearer processor through the cross-cage fiber-optic line; and a local data interface,
- coupled to the local bearer processor and a local user data network,
- adapted to exchange data between the local bearer processor and the local user data network, the data having been exchanged through the bearer channels and processed by the local bearer processor, and the local data interface further adapted to exchange at least a second subset of the status data with the paired bearer processor through the local user data network.

* * * * *